April 30, 1929.  C. C. HOUSTON  1,711,023
GRAPE CRATE
Filed Oct. 18, 1927
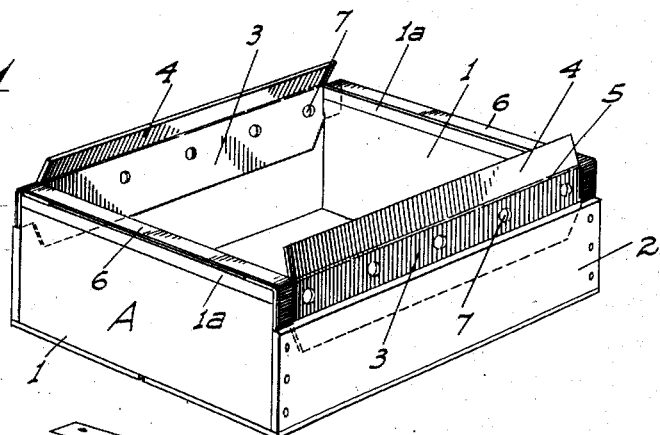
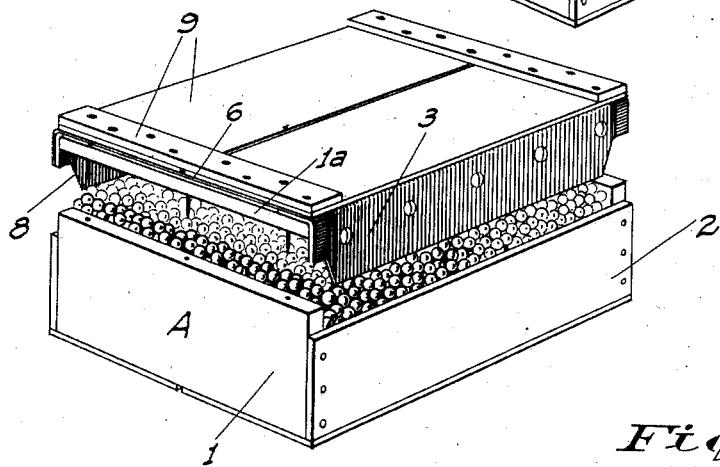
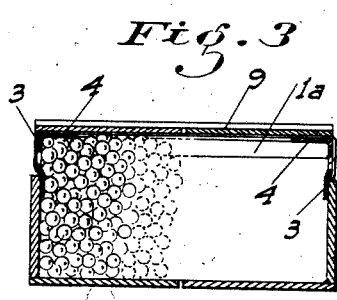
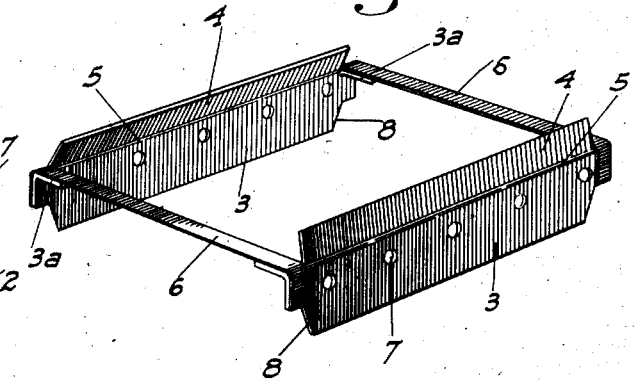
INVENTOR
C. C. Houston
BY
ATTORNEY Patented Apr. 30, 1929.

1,711,023

UNITED STATES PATENT OFFICE.

CLARENCE C. HOUSTON, OF LODI, CALIFORNIA.

GRAPE CRATE.

Application filed October 18, 1927. Serial No. 226,852.

This invention relates to improvements in containers for fruit and particularly to crates used in the shipment of fresh grapes.

Fresh grapes are ordinarily shipped in wooden crates which are packed at or near the vineyards where the same are grown and then shipped by truck, train or like means of transportation to distant points. When the ordinary crate is packed with the friut and lidded and then shipped a considerable distance the weight of the fruit and the handling it receives from point to point causes the bunches of grapes to settle. Thus when a crate which appears to be completely full of the fruit at the shipping point reaches its destination it appears to be only partly filled with fruit. This works to a disadvantage in the selling of the fruit and also provides a very poor display thereof when the lid is removed.

To this end I have provided detachable end-board extensions which build up the normal height of the regular sized grape crate so that after the fuit has reached its destination these extensions may be removed, which compensates for the shrinkage of the fruit due to settling, and leaves the crate as opened completely full of the fruit and the same is also well displayed. In connection with these end extensions I have provided a very simple and effective side closure to fill up the spaces at the sides of the crate occasioned by the additional height given the same by the end extensions. These side elements will prevent an exposure of the grapes through the cracks between the lid and the regular sides of the crate so as to prevent the picking off of grapes by unauthorized persons through such cracks. These side members will be built up with the crate as a component part of the end extensions and the lid of the crate so that as the lid is removed these side elements will be removed therewith as a unit.

I further aim to so arrange the entire structure that it will be very simple and inexpensive, and at the same time readily applied to the crate with a minimum expense of labor and material.

These objects I accomplish by means of such structure and relative arrangement of parts as will fully appear by a perusal of the following specification and claims.

In the drawings similar characters of reference indicate corresponding parts in the several views:

Fig. 1 is a perspective view of a standard grape crate showing my end board extensions and side elements installed thereon ready for packing the grapes into the crate.

Fig. 2 is a perspective view of a filled crate showing how the end board extensions, lid and side members may be removed therefrom as a unit.

Fig. 3 is a vertical transverse section through a crate of grapes after it has been packed and lidded with my end board extensions and side elements shown in connection therewith.

Fig. 4 is a perspective view of my improved side element construction.

Referring now more particularly to the characters of reference on the drawings, A designates generally the standard grape crate having end-boards 1 and side boards 2. In order to increase the normal height of the end-boards 1 in accordance with the objects of my invention I nail on the upper edges of the end-boards 1 extensions $1^a$. My improved side elements 3 are made preferably of paper board and have upper extensions 4 with an intermediate crease 5 for allowing the extensions 4 to be bent relative to the sides 3. The sides are made in a pair for each box with intermediate connecting straps 6. Each side is provided with suitable orifices 7 for ventilation purposes. The lower edges of the sides 3 are beveled off at 8 so that they may be readily put into position behind the boards 2 and between the end boards 1. When a crate is to be packed the straps 6 are laid across the extensions $1^a$ as shown in Fig. 1 and the sides 3 are positioned inside of the sides 2 as explained. The grapes are then packed into the crate fully up to the plane of the top edges of the extensions $1^a$. The extensions 4 are then bent over and the lid 9 of the crate is then nailed into position onto the end extensions 1. When this is done the sides 3 fully prevent any possibility of the grapes being picked off or out of the crate through the space or crack between the lid 9 and the sides 2.

When the grapes reach their destination packed as above described the extensions $1^a$ are pried off of the end-boards 1 and since the side elements 3 and lid 9 are secured thereto in the manner described, these all come off of the top of the crate as a unit. The grapes will by this time have settled down to a point slightly above the top edge of the end-boards 1 so that when this unitary structure is removed the original or standard crate shows full of grapes and well displayed. In the settling process the grapes will have taken a position so as to leave a slight space between them and the end-boards 2 near the top thereof so that if it is desired to replace the lid and side members 3 for any purpose these will readily slip to position without crushing the grapes.

Lips 3ª extend at right angles to the board on the top edge of each end thereof. These lips extend between the end extensions 1ª and the lid 9 so that the side elements may be secured thereto with or without the use of the straps 6.

The extensions 4 in addition to aiding in the securing of the parts together and the preventing of the picking off of the grapes from underneath the lid of the box also prevent the grapes from being crushed as the lid is being placed and nailed in position, since the overhanging extensions 4 will be pressed down against the grapes and keep them from getting squeezed between the lid boards and the top edges of the sides.

From the foregoing description it will be quite apparent that I have provided a removable extension means for the crate which admirably serves the initial purpose of compensating for the settling of the fruit, and at the same time provides a very simple and inexpensive means for completely enclosing the fruit within the crate in such a manner that it cannot be tampered with by either springing the lid boards up or by pulling the grapes through the crack between the lid boards and the side boards of the crate.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A fruit crate comprising end and side boards, end board extensions, a lid, side elements separate from the lid to fit inside the side boards and extend to the lid, and straps also separate from the lid connecting the side elements.

2. A fruit crate comprising side and end boards, end board extensions, side elements extending between the side boards and the top plane of the end extensions, straps connecting the side elements and resting on the extensions, and a lid secured to the extensions with the straps secured between the two.

3. Crate sides for the purpose described comprising a pair of flat elements, straps connecting the ends of the pair, and horizontal extensions on the top edge of each flat element.

4. Crate sides for the purpose described comprising a pair of flat paper boards, an extension along the top edge of each board, and horizontal straps connecting the boards.

5. A fruit crate comprising end members and side boards extending therebetween, the ends being higher than the sides, a lid to rest on and be secured to the end members, and relatively thin side elements to fit inside the side boards and extend to the lid.

6. A structure as in claim 5, with means for securing said elements to the lid when the latter is secured to the end members.

7. A fruit crate comprising end members and side boards extending therebetween, the ends being higher than the sides, a lid to rest on and be secured to the end members, side elements to fit inside the side boards and extend to the lid, and flaps on the side elements to extend directly under the lid.

8. A fruit crate comprising end and side boards, extensions detachably secured on the end boards, a lid to rest on and be permanently secured to said extensions, whereby said lid and extensions may be removed from the crate as a unit, side elements to extend from below the top edges of the sides of the lid, and means for securing said elements to the removable lid unit when the lid is secured to the extensions.

In testimony whereof I affix my signature.

CLARENCE C. HOUSTON.